(12) United States Patent
Goettel et al.

(10) Patent No.: US 9,038,519 B2
(45) Date of Patent: May 26, 2015

(54) APPARATUS, METHOD, AND SYSTEM FOR ORIENTING A SAW CHAIN LINK ON A SPROCKET

(71) Applicant: BLOUNT, INC., Portland, OR (US)

(72) Inventors: Mike Goettel, Canby, OR (US); Michael D. Harfst, Milwaukie, OR (US); Christopher D. Seigneur, West Linn, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 13/828,917

(22) Filed: Mar. 14, 2013

(65) Prior Publication Data
US 2014/0259700 A1    Sep. 18, 2014

(51) Int. Cl.
*B23D 63/16*    (2006.01)
*B27B 17/02*    (2006.01)
*B27B 17/04*    (2006.01)

(52) U.S. Cl.
CPC .............. *B23D 63/168* (2013.01); *B27B 17/02* (2013.01); *B27B 17/04* (2013.01)

(58) Field of Classification Search
USPC ................................. 30/381–387; 83/830–834
See application file for complete search history.

(56) References Cited

U.S. PATENT DOCUMENTS

| | | | | |
|---|---|---|---|---|
| 3,269,431 A * | 8/1966 | Ehlen | | 30/138 |
| 4,387,615 A | 6/1983 | Lemery | | |
| 4,530,679 A | 7/1985 | Reynolds | | |
| 4,593,591 A * | 6/1986 | Beerens | | 83/834 |
| 4,747,214 A * | 5/1988 | Fischer et al. | | 30/384 |
| 4,754,549 A * | 7/1988 | Fischer et al. | | 30/384 |
| 5,098,348 A * | 3/1992 | O'Neel | | 474/157 |
| 5,699,619 A | 12/1997 | Sundstrom | | |
| 6,006,629 A * | 12/1999 | Lofgren | | 76/80.5 |
| 2008/0098870 A1 * | 5/2008 | Goettel et al. | | 83/834 |
| 2008/0110316 A1 * | 5/2008 | Harfst | | 83/830 |
| 2010/0005666 A1 | 1/2010 | Seigneur et al. | | |

FOREIGN PATENT DOCUMENTS

EP    0476819 A1    3/1992

* cited by examiner

*Primary Examiner* — Stephen Choi
(74) *Attorney, Agent, or Firm* — Schwabe Williamson & Wyatt

(57) ABSTRACT

Embodiments herein provide a modified pitch sprocket to provide an orientation of a saw chain link, such as a cutter link or drive link, with respect to the direction of travel of the link, as it traverses the sprocket that is different than the orientation of the link as it traverses a straight portion of the guide bar. In some embodiments, the modified pitch sprocket may orient the cutter link to provide radial extension for a depth gauge of the cutter link relative to a cutting element of the cutter link. This may facilitate shaping of the depth gauge and/or cutting element, such as by a sharpening element, as the cutter link traverses the sprocket.

16 Claims, 10 Drawing Sheets

APPARATUS, METHOD, AND SYSTEM FOR ORIENTING A SAW CHAIN LINK ON A SPROCKET

TECHNICAL FIELD

Embodiments herein relate to the field of chainsaws, and, more specifically, to an apparatus, method, and system for orienting a saw chain link on a sprocket.

BACKGROUND

Saw chains for wood chainsaws include cutter links having sharp cutting elements for cutting through wood. The cutting elements may become dull from repeated use. Accordingly, the cutting elements may be periodically sharpened to extend the life of the saw chain. In some cases, the cutting element may be sharpened by bringing a sharpening stone into contact with the cutting element while the cutter link traverses a guide bar of the chainsaw.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
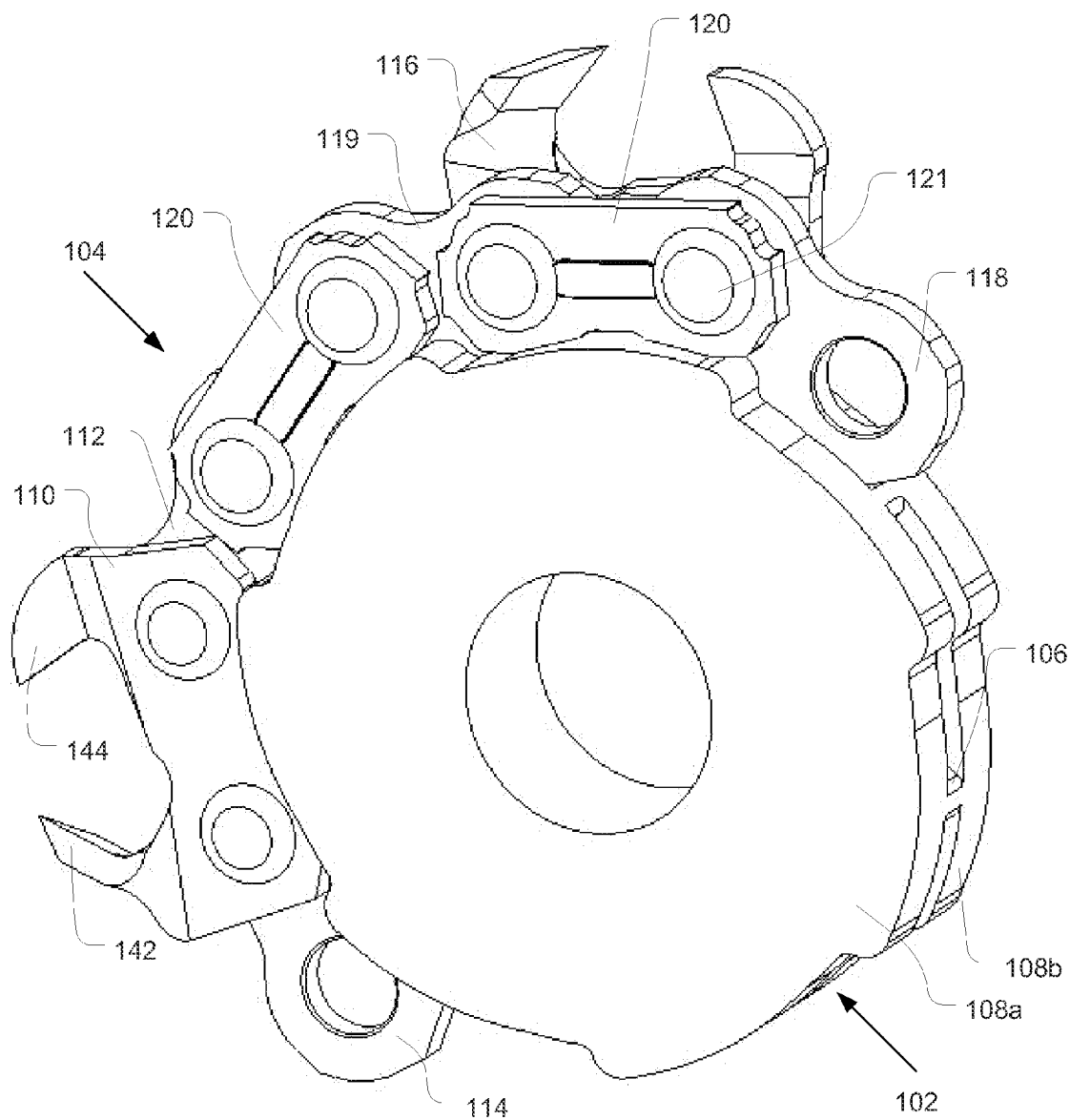
FIG. 1A illustrates a perspective view of a modified pitch sprocket engaged with a saw chain, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide an apparatus, system, and method for orienting a link (e.g., a cutter link and/or drive link) of a saw chain on a sprocket of a chainsaw. In some embodiments, the sprocket may be a modified pitch sprocket to provide a desired orientation of the link as it traverses the sprocket. The modified pitch sprocket may drive a saw chain around a curved end of a guide bar of the chainsaw. The term "modified pitch" is used to indicate that the modified pitch sprocket may provide an orientation (e.g., angle) of the saw chain link, with respect to a path of travel of the link, that is different when the link traverses the modified pitch sprocket than when the link traverses a straight portion of the guide bar, and also different from the pitch provided by a standard sprocket. This orientation of the link may facilitate engagement of the link with a sharpening element as the link traverses the sprocket.

In various embodiments, the chainsaw may include a guide bar extending from a body of the chainsaw. The body may include a housing, with a motor disposed inside the housing to drive the saw chain around the guide bar. The guide bar may include one or more sprockets at ends of the guide bar, with straight portions disposed between the ends of the guide bar. For example, the guide bar may include a drive sprocket at a proximal end of the guide bar and/or a nose sprocket at a distal end of the guide bar. At least one of the drive sprocket and/or nose sprocket may be a modified pitch sprocket as described herein.

In various embodiments, the saw chain may include a plurality of links coupled to one another, including one or more cutter links, drive links, and/or dresser links. The links may include a pair of rivet holes (e.g., a front rivet hole and a rear rivet hole) to couple the links to respective adjacent links. In some embodiments, one or more rivets and/or tie straps may be used to couple the links together via the rivet holes.

In various embodiments, the cutter links may include a cutting element and a depth gauge. The cutting element may be, for example, a sharpened cutting element for cutting wood and the like. The cutting element may generally extend upward from the body of the cutter link. In some embodiments, the depth gauge may extend upward from the body of the cutter link in front of the cutting element (e.g., in the direction of travel from the cutter link). The depth gauge may limit the depth of cut of the cutting element, for example to facilitate efficient operation of the chainsaw, prevent/reduce kickback events, and/or prevent/reduce damage to the saw chain.

In some embodiments, the cutter link may be integrated into a drive link. Such a link may be referred to as a cutter drive link. The cutter drive link may include a cutting element that extends upward from the body of the cutter drive link and a tang that extends downward from the body of the cutter drive link. In some embodiments, the cutter drive link may further include a depth gauge that extends upward from the body. For example, the depth gauge may be disposed in front of the cutting element (e.g., in the direction of travel of the saw chain).

The body of the cutter drive link may further include a pair of rivet holes to couple the cutter drive link to adjacent links. The cutter drive link may be a center link of the saw chain and may be coupled to adjacent side links (e.g., tie straps) on either or both sides of the cutter drive link (e.g., left or right side). The cutter drive link may generally ride in the groove of the guide bar and/or in the pockets of the sprocket.

In other embodiments, the cutter link may be integrated into a tie strap. Such a link may be referred to as a cutter tie strap. The cutter tie strap may include a body with a pair of rivet holes, and a cutting element that extends upward from the body. The cutter tie strap may be a side link and may ride on the rail of the guide bar. The cutter tie strap may have foot portions at the bottom of the body that are configured to ride on the rail.

In various embodiments, the cutting element of the cutter link may be sharpened by bringing a sharpening element into contact with the cutting element as the saw chain is driven on the guide bar. In some embodiments, the sharpening element may be positioned proximal to an end of the guide bar to contact the saw chain as the saw chain traverses the modified pitch sprocket (e.g., the drive sprocket or nose sprocket). The sharpening element may be selectively actuated, such as by a lever or other mechanism, to bring the sharpening element into contact with the saw chain. In some embodiments, the sharpening element may be included in/on the chainsaw. In other embodiments, the sharpening element may be included in an external sharpening apparatus, such as a pedestal sharpener, nose-mounted sharpener, etc.

In some embodiments, the sharpening element may be a sharpening stone. In some embodiments, the saw chain may further include one or more dresser links having an abrasive conditioning portion configured to contact the sharpening stone to condition the sharpening stone. Other embodiments of the saw chain may not include dresser links.

In other embodiments, the sharpening element may include a base material (e.g., metal) with a layer of abrasive elements disposed on a surface of the base material. In some embodiments, the base material may be a strip of flexible material, such as a metal strip. The abrasive elements may include, for example, boron nitride, diamonds, and/or diamond-like carbon (DLC). In some embodiments, the surface of the base material, on which the abrasive elements are disposed, may be substantially flat. In other embodiments, the surface of the base material may be shaped to provide a desired grind shape to the cutting elements and/or depth gauges of the saw chain. In some embodiments, a dresser link may not be used or needed with the sharpening element having a layer of abrasive elements on the base material.

In various embodiments, the cutter link may have a depth gauge setting. The depth gauge setting may correspond to a difference in height between the cutting element and the depth gauge as the cutter link traverses the straight portion of the guide bar. In various embodiments, the modified pitch sprocket may orient the cutter link to facilitate sharpening of the cutter link by the sharpening element to provide a desired depth gauge setting. For example, the modified pitch sprocket may angle the cutter link to raise the front rivet hole (e.g., the rivet hole below the depth gauge) higher than the rear rivet hole (e.g., the rivet hole below the cutting element) with respect to the direction of travel of the cutter link. This may cause the depth gauge to extend radially relative to the cutting element. This angled orientation of the cutter link may allow the sharpening element to grind the depth gauge, causing the depth gauge to have a lower height above the front rivet hole over successive sharpenings. This lowering of the depth gauge may compensate for a corresponding reduction of height of the cutter link above the rear rivet hole. Thus, the cutter link may provide a desired depth gauge setting after sharpening the depth gauge and/or cutting element.

For example, the rivet holes of the cutter link may be at substantially the same height relative to the guide bar as the cutter link traverses the straight portion of the guide bar. In various embodiments, the modified pitch sprocket may provide a radial extension difference between the rivet holes of the cutter link as the cutter link traverses the sprocket. The radial extension difference may be defined as the difference between the radial extension of the front rivet hole and the radial extension of the rear rivet hole as the cutter link traverses the modified pitch sprocket. The radial extension of the rivet holes may be the distance between the center of the rivet hole and the center of rotation of the modified pitch sprocket.

In various embodiments, the radial extension difference may provide a greater radial extension for the front rivet hole (under the depth gauge) than the rear rivet hole (under the cutting element). For example, in one embodiment, the radial extension difference may be about 0.030 inches to about 0.050 inches, such as about 0.040 inches.

After shaping by the sharpening element, the depth gauge and cutting element may have similar radial extensions (as measured from the center of rotation of the sprocket to the furthest point of the depth gauge or cutting element). As the cutter link moves from the sprocket to the straight portion of the guide bar, the radial extension difference between the rivet holes of the cutter link may be translated to provide the depth gauge setting of the cutter link.

In some embodiments, the modified pitch sprocket may additionally or alternatively provide a desired orientation for a dresser link and/or drive link of the saw chain. The dresser link may include a conditioning portion (e.g., having an abrasive material) to condition the sharpening element. The modified pitch sprocket may provide a desired orientation for the dresser link to facilitate conditioning of the sharpening element as the dresser link traverses the sprocket.

In some embodiments, the drive link may include a conditioning portion to condition the sharpening element. Such a drive link may be referred to as a dresser drive link. The modified pitch sprocket may provide a desired orientation of the dresser drive link to facilitate conditioning of the sharpening element as the dresser drive link traverses the sprocket. The modified pitch sprocket may allow the conditioning portion to be oriented for conditioning the sharpening element as the dresser link (e.g., dresser drive link) traverses the modified pitch sprocket, while the dresser link may have another orientation on the straight run of the guide bar to facilitate cutting operation.

In some embodiments, the modified pitch sprocket may have offset pockets to provide the desired orientation of the cutter link. The modified pitch sprocket may include a plurality of pockets configured to engage respective drive links of the saw chain. For example, the modified pitch sprocket may include a spur with a substantially circular outer edge. The spur may include a plurality of pockets that extend inward from the outer edge. The pockets may include a front side wall and a back side wall. The front side wall may be the side of the pocket forward-most toward the direction of rotation of the sprocket, and the back side wall may be the side of the pocket opposite the direction of rotation. In some embodiments, the pockets may be offset so that the front side wall and back side wall are not symmetrical compared with a line that extends radially from the center of rotation of the sprocket through the middle of the pocket. These pockets may be referred to as offset pockets. In some embodiments, a front angle between the front wall and the radial line may be greater than a rear angle between the rear wall and the radial line. This may cause the drive link to be angled in the pocket.

The drive link may have an orientation with respect to a direction of travel as it traverses the modified pitch sprocket that is different by an offset angle compared to an orientation of the drive link with respect to the direction of travel as it traverses the straight portion of the guide bar. In some embodiments, the offset angle of the drive link may be about 3 to about 15 degrees, such as about 7 degrees. In some embodiments, the drive link may be a cutter drive link.

As discussed above, the cutter link may be a cutter drive link or a cutter tie strap. In embodiments including a cutter drive link, the offset angle may be oriented to provide greater radial extension to the front rivet hole than the rear rivet hole of the cutter drive link. In contrast, for a drive link coupled to an adjacent cutter tie strap, the offset angle of the cutter drive link may be oriented to provide greater radial extension for the rear rivet hole than the front rivet hole. This may facilitate a corresponding offset angle of the cutter tie strap. The cutter tie strap may have an orientation with respect to a direction of travel as it traverses the modified pitch sprocket that is different by an offset angle compared to an orientation of the cutter tie strap with respect to the direction of travel as it traverses the straight portion of the guide bar. In some embodiments, the offset angle of the cutter tie strap may be about 3 to about 15 degrees, such as about 7 degrees. The offset angle of the cutter tie strap may provide greater radial extension for the front rivet hole of the cutter tie strap than the rear rivet hole of the cutter tie strap.

In some embodiments, the sprocket may further include a pair of rims, and the spur may be coupled between the rims. The rims may have an outer edge that defines a rail on which the side links (e.g., tie straps or cutter links) rest as they traverse the sprocket. In some embodiments, the rail may be configured to provide the desired radial extension difference for the cutter tie straps and other links as described herein. For example, the rail may not have a constant diameter.

In some embodiments, the rail may include a plurality of support regions configured to support respective links (e.g., cutter tie straps or non-cutter tie straps). The support regions may include a first contact portion and a second contact portion. The first contact portion may be configured to contact a rear foot portion of the tie strap, and the second contact portion may be configured to contact a front foot portion of the tie strap. The second contact portion may be disposed further from the center of rotation of the sprocket than the first contact portion. This may provide the offset angle of the tie strap to provide the desired orientation of the cutter tie strap or to facilitate the orientation of an adjacent cutter drive link.

In other embodiments, the modified pitch sprocket may be a butterfly sprocket. The butterfly sprocket may include a spur that is stamped to form pockets and rails from one continuous sheet of material (e.g., metal).

Figure 1B:
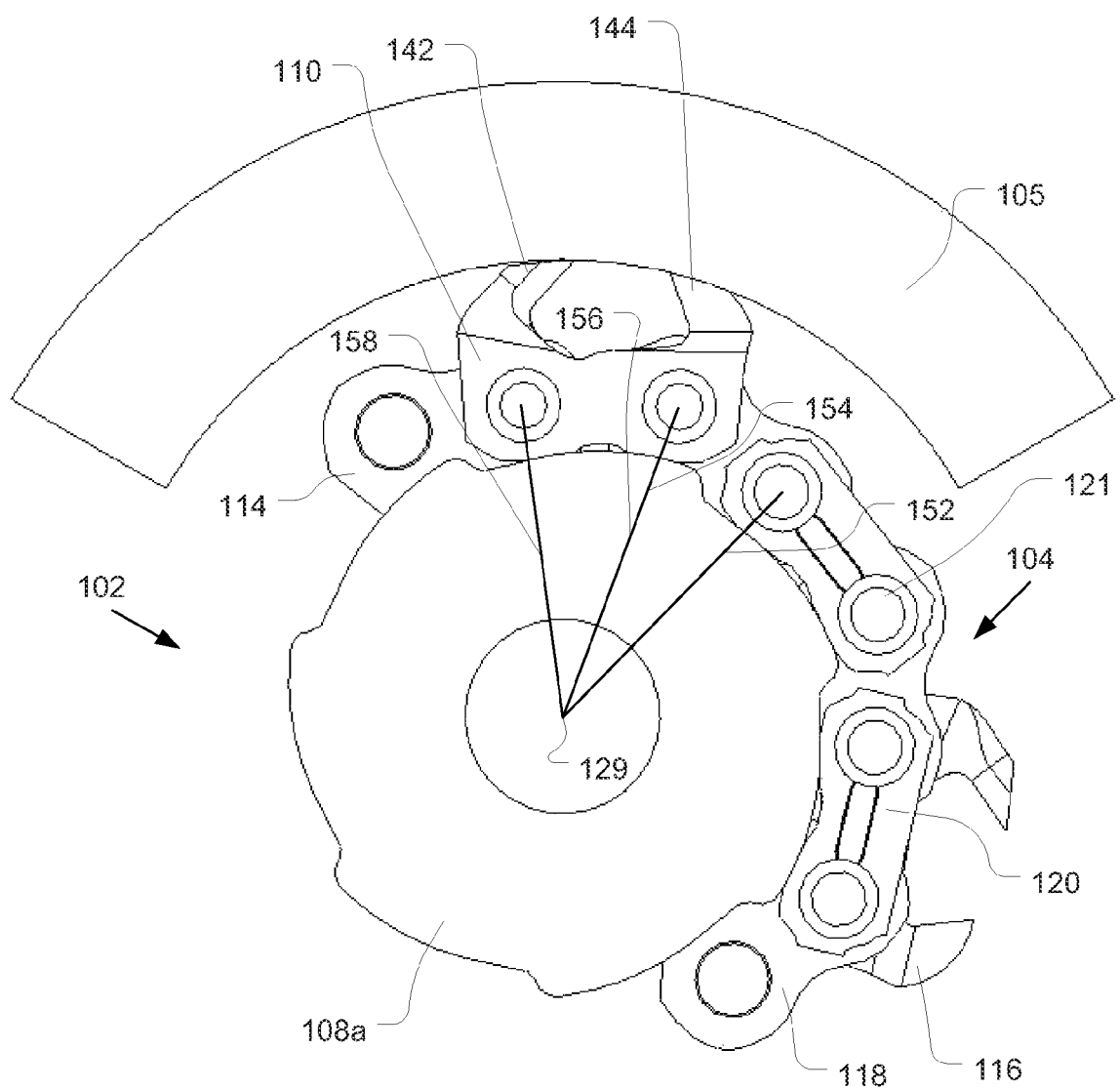
FIG. 1B illustrates a side view of the modified pitch sprocket and saw chain of FIG. 1A engaged with a sharpening element, in accordance with various embodiments.
Figure 1C:
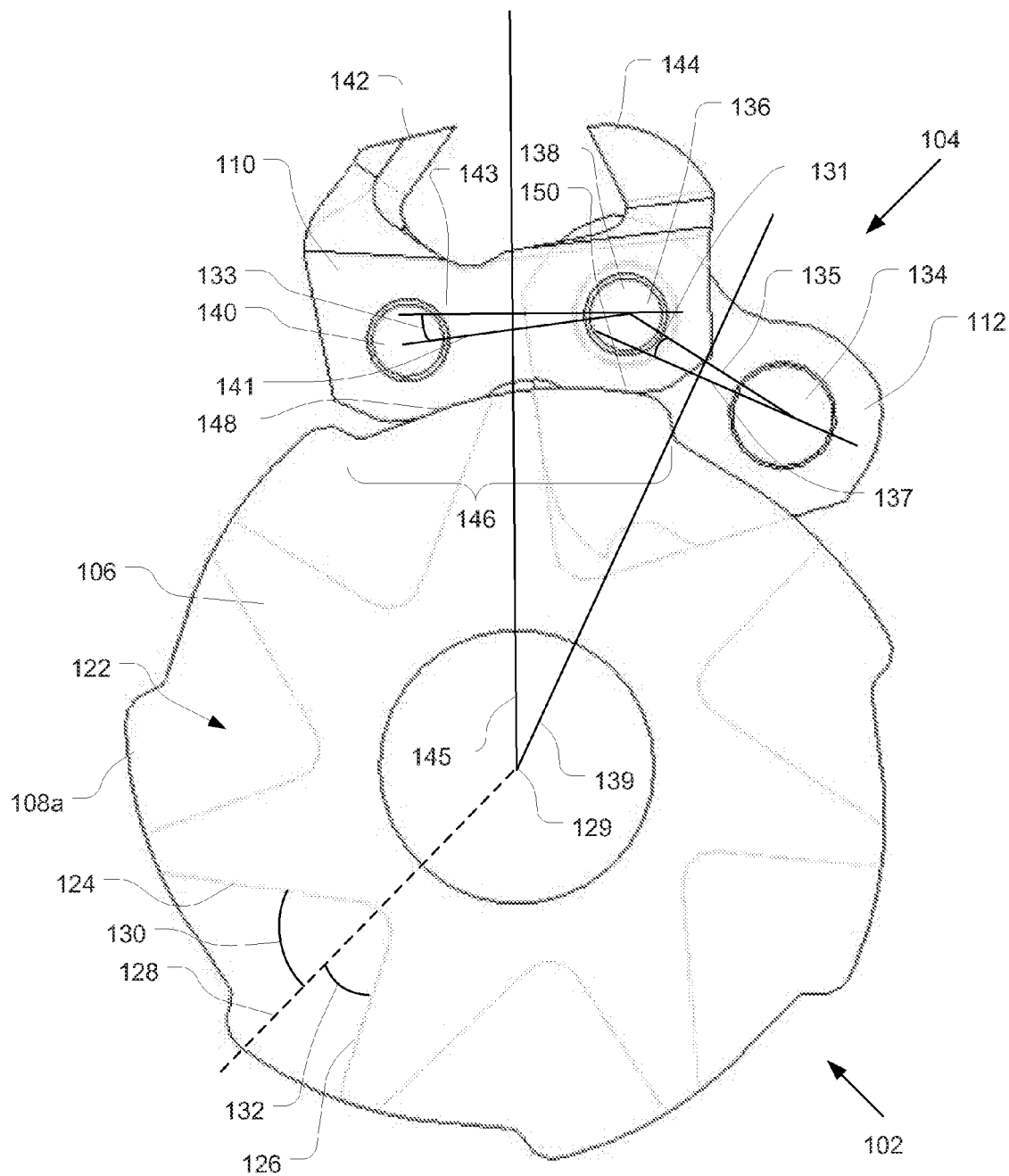
FIG. 1C illustrates a side view of the modified pitch sprocket and a portion of the saw chain of FIG. 1A, showing some internal structure, in accordance with various embodiments.

FIGS. 1A, 1B, and 1C illustrate a sprocket 102 and saw chain 104 in accordance with various embodiments. The sprocket 102 may be included in a guide bar of a chainsaw. The sprocket 102 includes a spur 106 coupled between a two rims 108a-b. The saw chain 104 includes a cutter link 110 that is a cutter tie strap coupled between a front drive link 112 and a rear drive link 114. As shown in FIGS. 1A and 1B, the saw chain 104 further includes another cutter link 116 coupled between drive links 118 and 119, and non-cutting tie straps 120. The cutter link 110 is a right side cutter tie strap, while cutter link 116 is a left side cutter tie strap. The links of the saw chain 104 are coupled to one another by rivets 121.

FIG. 1B further illustrates a sharpening element 105 that is actuated to be in contact with the cutter link 110.

As best seen in FIG. 1C, the spur 106 includes a plurality of pockets 122. The pockets 122 are angled to provide a desired orientation for the front drive link 112 and rear drive link 114. This, in turn, provides a desired orientation for the cutter link 110 to facilitate shaping of the cutter link 110 by the sharpening element 105.

The pockets 122 include a front side wall 124 and a back side wall 126. The pockets 122 are offset so that the front side wall 124 and back side wall 126 are not symmetrical about a radial line 128 (as shown in FIG. 1C) that extends radially from a center of rotation 129 of the sprocket 102 through the middle of the pocket 122. A front angle 130 between the front side wall 124 and the radial line 128 is greater than a rear angle 132 between the back side wall 126 and the radial line 128. This causes the drive links 112 and 114 to be angled downward in the respective pockets 122 (e.g., with a front rivet hole 134 of the drive link 112 closer to the center of rotation of the sprocket 102 than a rear rivet hole 136 of the drive link 112). This, in turn, causes the cutter link 110 to be angled with a front rivet hole 138 of the cutter link 110 disposed further from the center of rotation 129 of the sprocket 102 than a rear rivet hole 140 of the cutter link 110.

As further shown in FIG. 1C, the drive link 112 is angled by an offset angle 131, and the cutter link 110 is angled by an offset angle 133. The drive link 112 is configured so that a line 135 between the centers of the front rivet hole 134 and rear rivet hole 136 is parallel with the direction of travel of the drive link 112 as the drive link 112 traverses the straight run of the guide bar (not shown). As the drive link 112 traverses the sprocket 102, the drive link 112 is rotated so that the line 135 is angled by the offset angle 131 with respect to a direction of travel 137 of the drive link 112. The direction of travel 137 is shown perpendicular to a radial reference line 139 that runs through the center of rotation 129 of the sprocket 102 and bisects the centers of the front rivet hole 134 and rear rivet hole 136 (e.g., goes through the mid-point of the line 135). The offset angle 131 as shown is about 7 degrees. Other embodiments may include any suitable offset angle 131, such as an offset angle 131 of about 3 to about 15 degrees.

The rear drive link 114 has a similar offset angle to offset angle 131 of front drive link 112.

As shown in FIG. 1B, the offset angle 131 causes the front rivet hole 134 of the drive link 114 to have a radial extension distance 152 (as measured from the center of rotation 129 to the center of the front rivet hole 134) that is less than a radial extension distance 154 of the rear rivet hole 136 (as measured from the center of rotation 129 to the center of the rear rivet hole 136).

Referring again to FIG. 1C, the cutter link 110 is configured so that a line 141 between the centers of front rivet hole 138 and rear rivet hole 140 is parallel with the direction of travel of the cutter link 110 as the cutter link 110 traverses the straight run of the guide bar. As the cutter link 110 traverses the sprocket 102, the cutter link 110 is rotated so that the line 141 is angled by the offset angle 133 with respect to a direction of travel 143 of the cutter link 110. The direction of travel 143 is shown perpendicular to a radial reference line 145 that runs through the center of rotation 129 of the sprocket 102 and bisects the centers of the front rivet hole 138 and rear rivet hole 140 (e.g., goes through the mid-point of the line 141). The offset angle 133 as shown is about 7 degrees. Other embodiments may include any suitable offset angle 133, such as an offset angle 133 of about 3 to about 15 degrees.

As shown in FIG. 1B, the offset angle 133 causes the front rivet hole 138 of the cutter link 110 to have a radial extension distance 156 (as measured from the center of rotation 129 to the center of the front rivet hole 138) that is greater than a radial extension distance 158 of the rear rivet hole 140 (as measured from the center of rotation 129 to the center of the rear rivet hole 140).

The cutter link 110 includes a cutting element 142 and a depth gauge 144. The offset angle 131 of the cutter link 110 provided by the angled pockets 122 pushes the depth gauge 144 radially so that the depth gauge 144 may be shaped by the sharpening element 105. This may provide/maintain a desired depth gauge setting for the depth gauge 144 corresponding to a height differential between the cutting element 142 and the depth gauge 144 as the cutter link 110 traverses a straight portion (not shown) of the guide bar.

As shown in FIG. 1C, the cutter link 110 is supported on rim 108a by a support region 146. The rims 108a and 108b include a plurality of support regions including the support region 146. The support region 146 contacts the cutter link 110 at a first contact portion 148 and a second contact portion 150. The first contact portion 148 contacts the cutter link 110 substantially below the cutting element 142, and the second contact portion 150 contacts the cutter link substantially below the depth gauge 144. The second contact portion 150 is disposed further from the center of rotation 129 of the sprocket 102 than the first contact portion 148. This facilitates the offset angle 133 of the cutter link 110.

Figure 2A:
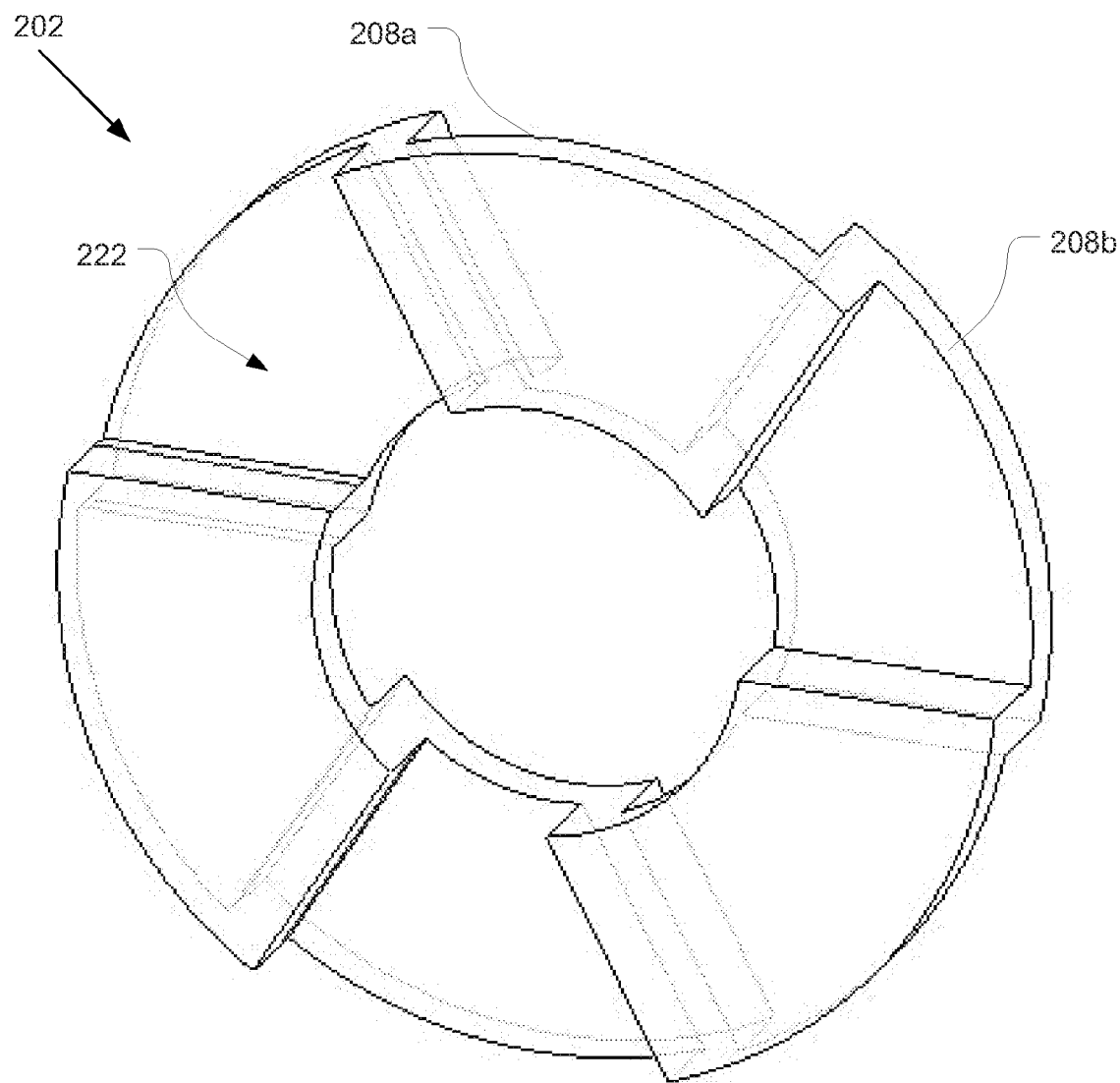
FIG. 2A illustrates a perspective view of a modified pitch butterfly sprocket in accordance with various embodiments.
Figure 2B:
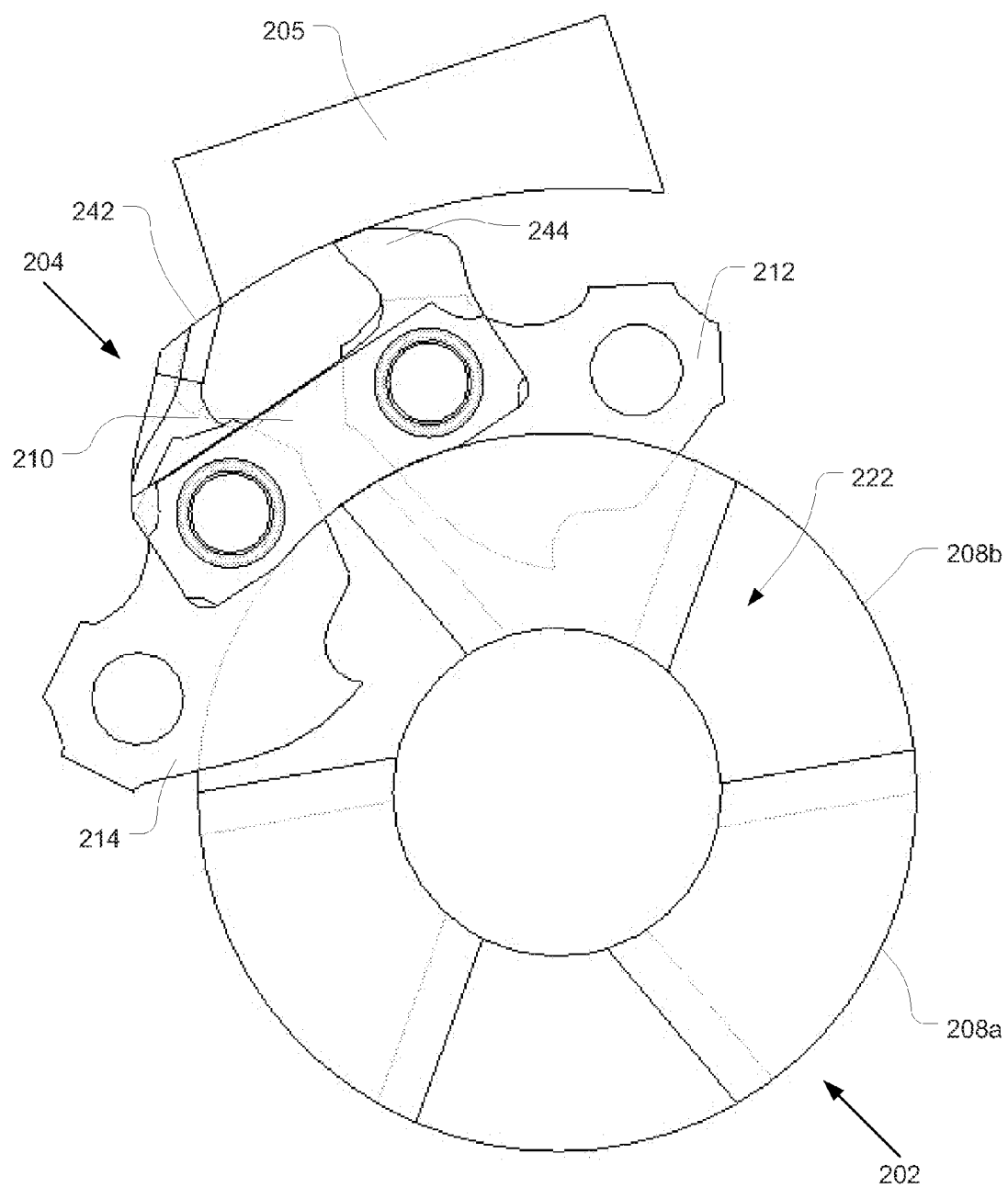
FIG. 2B illustrates a side view of the modified pitch butterfly sprocket of FIG. 2A engaged with a saw chain and a sharpening element, in accordance with various embodiments.

FIG. 2A illustrates a butterfly sprocket 202 in accordance with various embodiments. FIG. 2B illustrates a saw chain 204 engaged with the butterfly sprocket 202 and a sharpening element 205, in accordance with various embodiments. The butterfly sprocket 202 may be formed (e.g., stamped) from one sheet of metal. The butterfly sprocket 202 may include pockets 222 and rims 208a-b formed from one sheet of material (e.g., metal). The pockets 222 and rims 208a-b may be formed by, for example, stamping the material to press alternating sections in opposite directions, as shown.

The saw chain 204 may include a cutter link 210 having a cutting element 242 and a depth gauge 244. The cutter link 210 is coupled between a front drive link 212 and a rear drive link 214. In various embodiments, the pockets 222 are angled to provide an orientation of the drive links 212 and 214 and cutter link 210 similar to the respective drive links 112 and 114 and cutter link 110 of FIGS. 1A-1C. This may facilitate shaping of the cutter link 210 by sharpening element 205, as discussed herein.

Figure 3A:
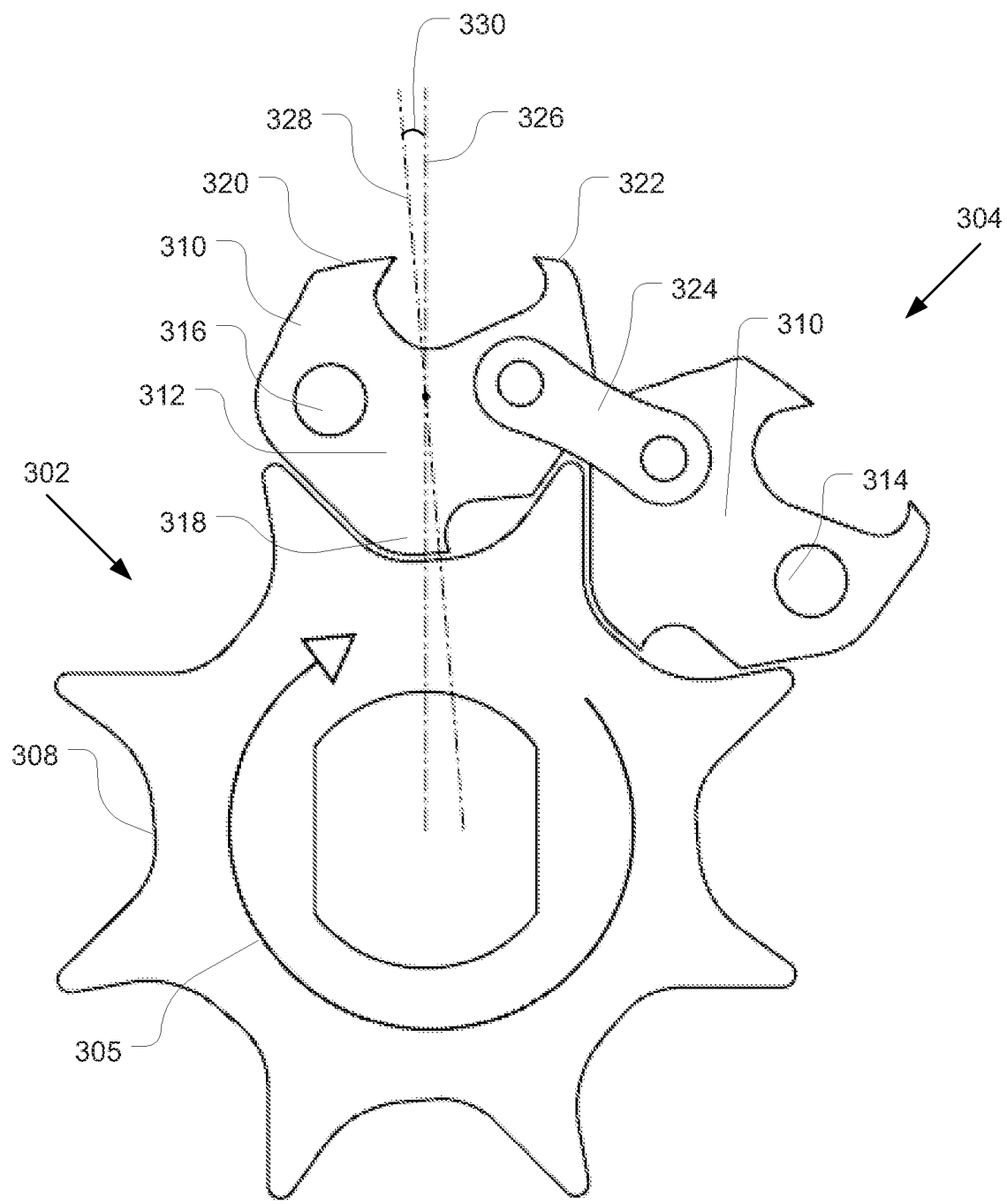
FIG. 3A illustrates a side view of a modified pitch sprocket engaged with a saw chain, in accordance with various embodiments.
Figure 3B:
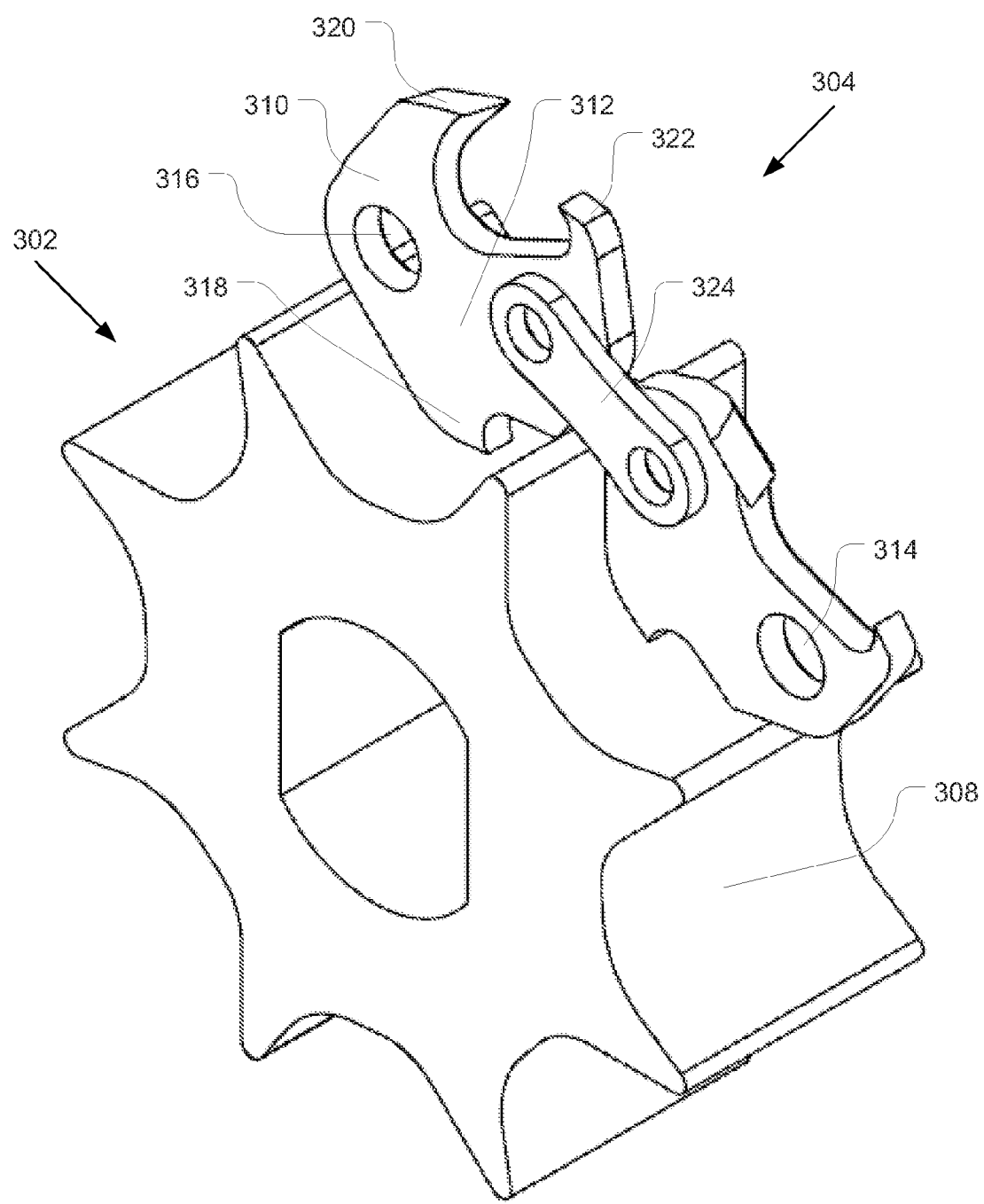
FIG. 3B illustrates a perspective view of the modified pitch sprocket and saw chain of FIG. 3A, in accordance with various embodiments.
Figure 3C:
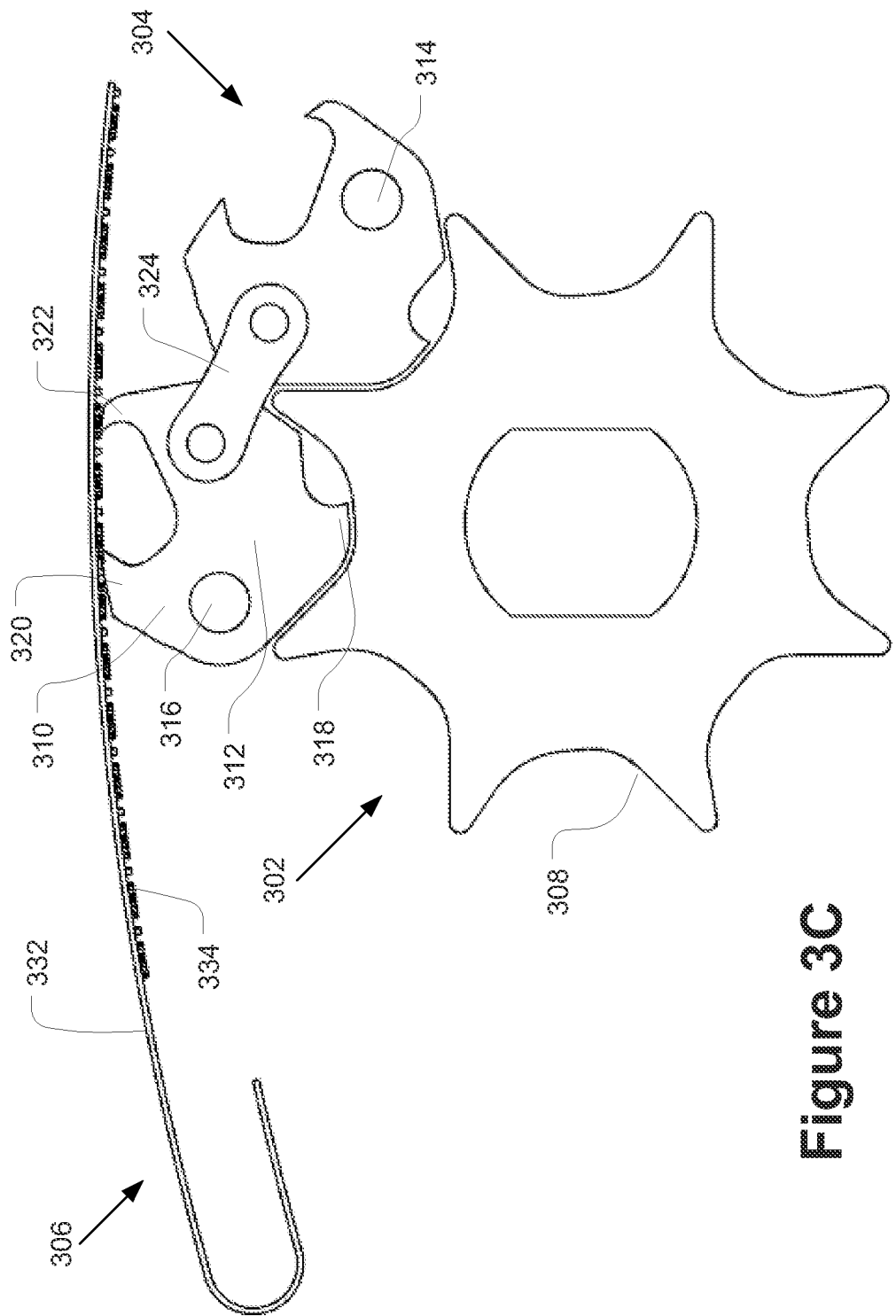
FIG. 3C illustrates a side view of the modified pitch sprocket and saw chain of FIG. 3A with a sharpening element in an actuated position, in accordance with various embodiments.
Figure 3D:
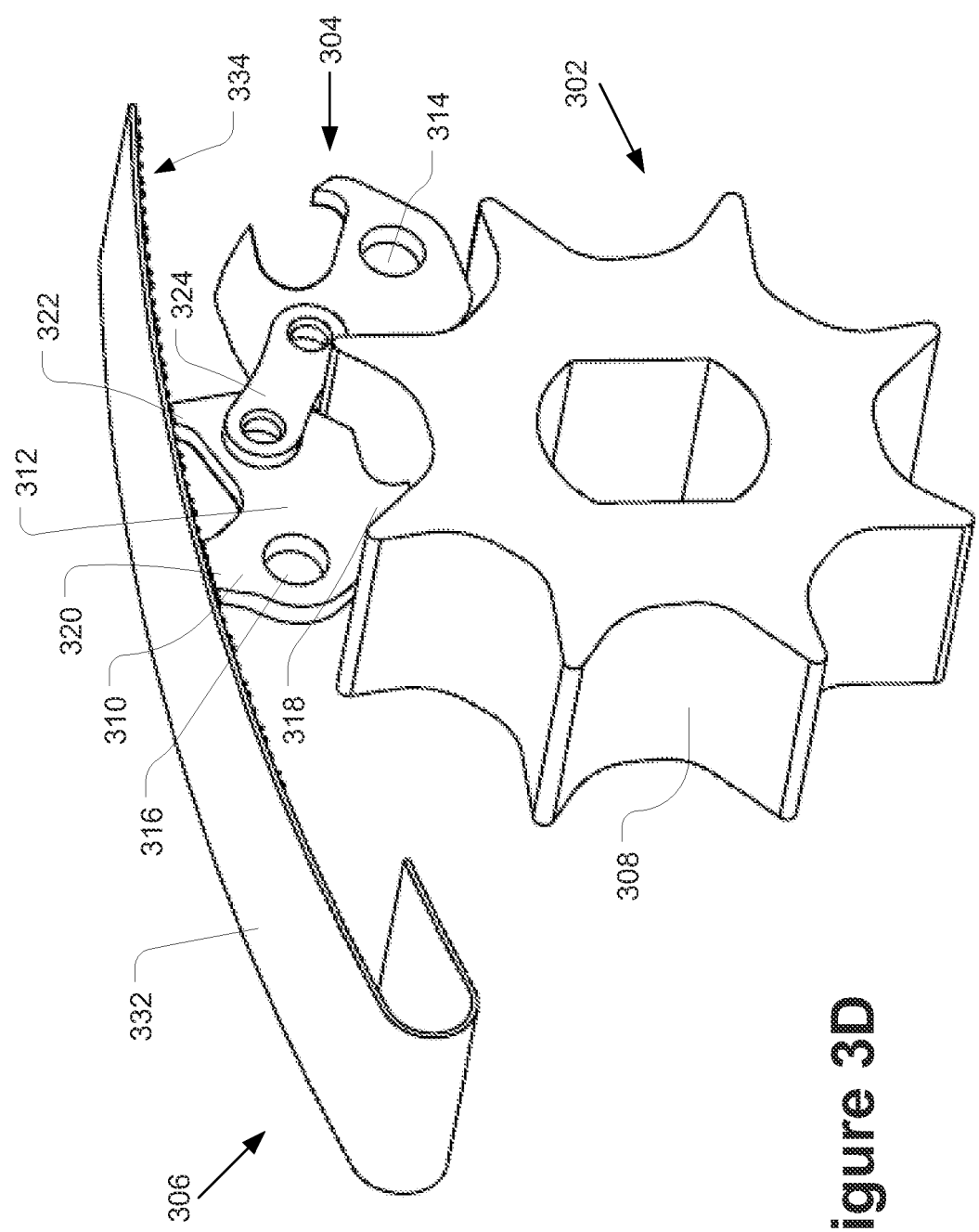
FIG. 3D illustrates a perspective view of the modified pitch sprocket, saw chain, and sharpening element of FIG. 3C, in accordance with various embodiments.
Figure 3E:
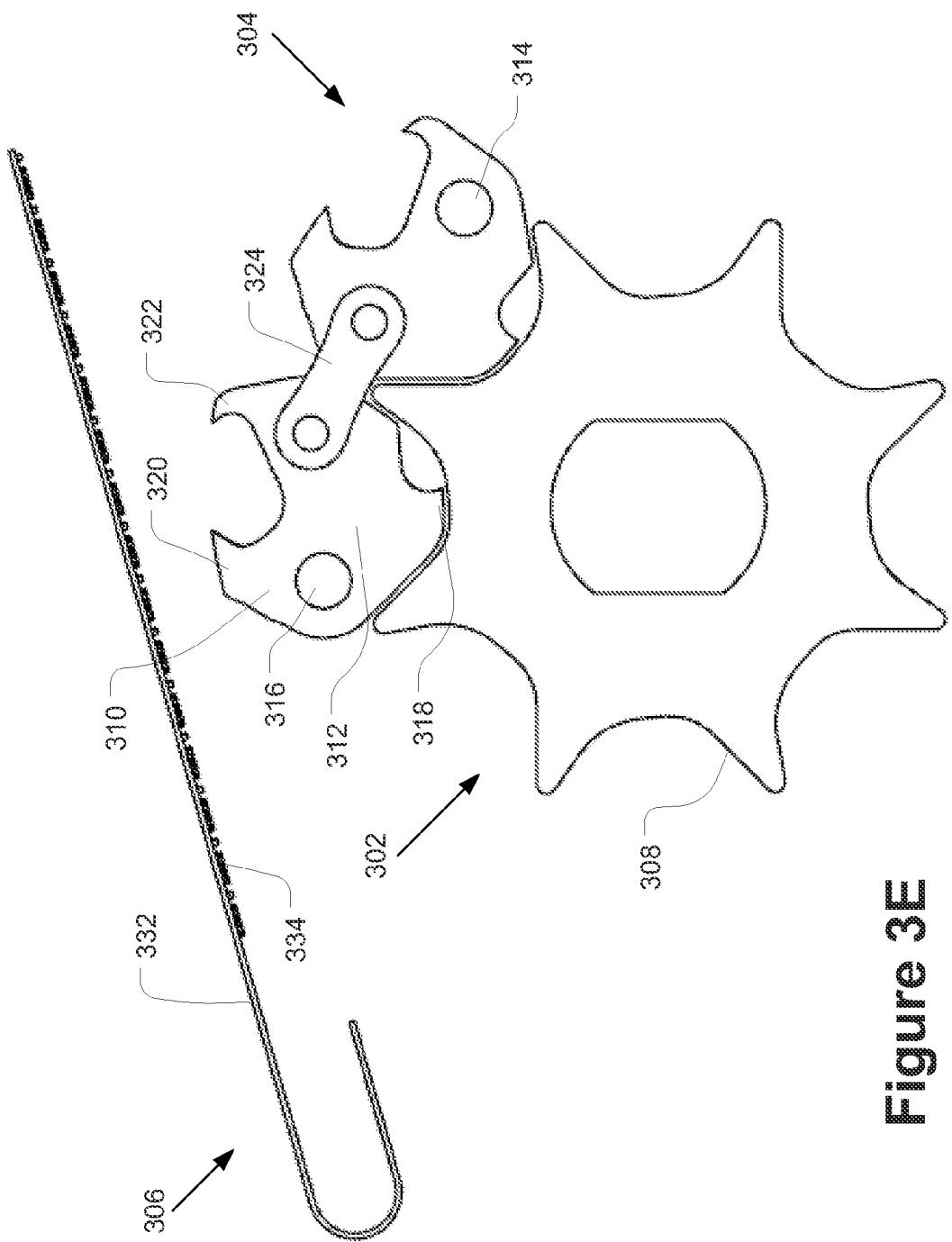
FIG. 3E illustrates a side view of the modified pitch sprocket, saw chain, and sharpening element of FIG. 3C with the sharpening element in an un-actuated position, in accordance with various embodiments.

FIGS. 3A, 3B, 3C, 3D, and 3E illustrate a modified pitch sprocket 302 and saw chain 304 in accordance with various embodiments. FIGS. 3C, 3D, and 3E further show a sharpening element 306 in accordance with various embodiments.

The modified pitch sprocket 302 is a rimless sprocket having a spur and no rims. The modified pitch sprocket 302 further includes pockets 308. The sprocket 302 may be disposed at an end of a guide bar, and may rotate in a rotational direction 305, as shown in FIG. 3A.

The saw chain 304 includes cutter drive links 310. The cutter drive links 310 include a body 312 with front rivet hole 314 and rear rivet hole 316. A tang 318 extends downward from the body 312. A cutting element 320 extends upward from the body 312 above the rear rivet hole 316, and a depth gauge 322 extends upward from the body 312 above the front rivet hole 314. The cutter drive links 310 are coupled to one another by tie strap 324.

The cutter drive links 310 have a first orientation, with respect to the direction of travel of the cutter drive link 310, as the cutter drive link 310 traverses a straight portion (not shown) of the guide bar. The first orientation is represented in FIG. 3A by first orientation line 326. The pockets 308 of the sprocket 302 angle the cutter drive links 310 to have a second orientation, with respect to the direction of travel of the cutter drive link 310, as the cutter drive link 310 traverses the sprocket 302. The second orientation is represented in FIG. 3A by second orientation line 328. The second orientation may be different from the first orientation by an offset angle 330. In some embodiments, the offset angle 330 may be about 3 to about 15 degrees.

The offset angle 330 may push the depth gauge 322 radially as the cutter drive link 310 traverses the sprocket 302. For example, a radial extension distance of the front rivet hole 314, with respect to the center of rotation of the sprocket 302, may be greater than a radial extension distance of the rear rivet hole 316.

The radial extension of the depth gauge 322 provided by the pocket 308 may allow the depth gauge 322 to be shaped by the sharpening element 306. The depth gauge 322 may be shaped to provide and/or maintain a desired depth gauge setting of the depth gauge 322 (e.g., a height differential between the cutting element 320 and the depth gauge 322 as the cutter drive link traverses the straight portion of the guide bar.

As shown in FIGS. 3C, 3D, and 3E, the sharpening element 306 may include a strip 332 of base material with a plurality of abrasive elements 334 disposed on a surface of the strip 332. The abrasive elements 334 may include, for example, boron nitride, diamonds, and/or diamond-like carbon (DLC). In some embodiments, the strip 332 may be a flexible material, such as metal. With this design of sharpening element 306, the surface of the strip 332 may not change significantly from contact with the saw chain 304, so a dresser link may not be needed.

The sharpening element 306 may be selectively brought into contact with the saw chain 304 (e.g., cutter drive links 310). FIGS. 3C and 3D show the sharpening element 306 in an actuated position in which the sharpening element 306 is in contact with the saw chain 304. FIG. 3E shows the sharpening element in an un-actuated position in which the sharpening element 306 is not in contact with the saw chain 304.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A sprocket for a chainsaw, the sprocket comprising:
   a spur configured to drive a saw chain around a drive end of a guide bar of a chainsaw, wherein the saw chain includes cutter links that have a first orientation as the cutter links traverse a straight portion of the guide bar; and
   a plurality of pockets disposed in the spur to engage the saw chain, wherein the pockets are asymmetrical with respect to a radius of the sprocket to cause the cutter links to have a second orientation as the cutter links traverse the sprocket, wherein the second orientation is different from the first orientation by an offset angle, and wherein the second orientation positions a depth gauge of the cutter link with a radial extension with respect to a center of rotation of the sprocket that is equal to or greater than a radial extension of a cutting element of the cutter link to facilitate engagement of the depth gauge with a sharpening element.

2. The sprocket of claim 1, wherein the cutter links include:
   a body;
   the cutting element extending upward from the body;
   the depth gauge extending upward from the body;
   a first rivet hole in the body below the cutting element; and
   a second rivet hole in the body below the depth gauge,
   wherein the pockets are configured to orient the cutter links with a first radial extension of the first rivet hole from a center of rotation of the sprocket that is less than a second radial extension of the second rivet hole from the center of rotation of the sprocket.

3. The sprocket of claim 2, wherein a height of the first rivet hole is substantially equal to a height of the second rivet hole as the cutter link traverses a straight run of a guide bar.

4. The sprocket of claim 2, wherein a difference between the first and second radial extensions is about 0.030 inches to about 0.050 inches.

5. The sprocket of claim 1, wherein the cutter links are cutter drive links configured to ride in the pockets of the sprocket.

6. The sprocket of claim 1, wherein the asymmetrical pockets are each defined by a front side wall and a back side wall disposed at different angles with respect to a radial line disposed from the center of rotation of the sprocket through the respective pocket.

7. The sprocket of claim 1, wherein the cutter links are cutter tie straps coupled between respective front and rear drive links.

8. The system of claim 1, wherein the offset angle is about 3 to about 15 degrees.

9. The sprocket of claim 1, wherein the first orientation provides the depth gauge with a height relative to the guide bar that is less than a height of the cutting edge.

10. A system for a chainsaw comprising:
    a guide bar including:
       a straight portion;
       a drive sprocket disposed on a drive end of the guide bar and coupled to the straight portion, the drive sprocket including a pocket that is asymmetrical with respect to a radius of the drive sprocket;
    a saw chain configured to ride on the guide bar, the saw chain including a cutter drive link configured to be disposed in the pocket as the cutter drive link traverses the drive sprocket, and the cutter drive link including:
       a cutting element;
       a depth gauge;
       a first rivet hole below the cutting element; and
       a second rivet hole below the depth gauge;
    wherein the straight portion orients the cutter drive link at a first orientation with respect to a direction of travel as the cutter drive link traverses the straight portion of the guide bar, wherein the pocket of the sprocket orients the cutter drive link at a second orientation with respect to the direction of travel as the cutter drive link traverses the drive sprocket, wherein the second orientation is different from the first orientation by an offset angle, and wherein, in the second orientation, a first radial extension distance between the first rivet hole and a center of rotation of the drive sprocket is less than a second radial extension distance between the second rivet hole and the center of rotation of the drive sprocket.

11. The system of claim 10, wherein a height of the first rivet hole is substantially equal to a height of the second rivet hole as the cutter link traverses the straight portion of the guide bar.

12. The system of claim 10, wherein a difference between the first radial extension distance and the second radial extension distance is about 0.030 inches to about 0.050 inches.

13. The system of claim 10, wherein the asymmetrical pocket includes a front side wall and a back side wall and wherein, the front side wall is disposed at a smaller angle than the back side wall with respect to a radial line disposed from the center of rotation of the drive sprocket through the pocket.

14. The system of claim 10, wherein the drive sprocket is a rimless sprocket.

15. The system of claim 10, wherein the drive sprocket is a butterfly sprocket.

16. The system of claim 10, wherein the second orientation positions a depth gauge of the cutter link with a radial extension with respect to a center of rotation of the drive sprocket that is equal to or greater than a radial extension of a cutting element of the cutter link to facilitate engagement of the depth gauge with a sharpening element.

* * * * *